United States Patent [19]

Alker et al.

[11] Patent Number: 4,579,769
[45] Date of Patent: Apr. 1, 1986

[54] TIRE CORD FABRIC

[75] Inventors: Heinrich Alker, Hilden; Wilfried Krebs, Solingen; Eckhard Dressler, Leverkusen, all of Fed. Rep. of Germany

[73] Assignee: OLBO Textilwerke GmbH, Fed. Rep. of Germany

[21] Appl. No.: 616,439

[22] Filed: May 31, 1984

[30] Foreign Application Priority Data

Jun. 3, 1983 [DE] Fed. Rep. of Germany ....... 3320162

[51] Int. Cl.$^4$ .................. B32B 7/00; B32B 23/02; D03D 23/00
[52] U.S. Cl. .................. 428/193; 428/258; 139/383 R; 152/563
[58] Field of Search ............ 428/257, 258, 193, 192, 428/152, 229, 259; 139/383 R; 152/358; 57/902

[56] References Cited

U.S. PATENT DOCUMENTS

| | | | |
|---|---|---|---|
| 1,635,196 | 7/1927 | Steere | 428/258 X |
| 3,395,744 | 8/1968 | Wolf et al. | 57/902 X |
| 3,773,606 | 11/1973 | Worcester, Jr. et al. | 428/258 X |
| 4,196,763 | 4/1980 | Imamura | 428/258 X |

Primary Examiner—Lorraine T. Kendell
Attorney, Agent, or Firm—Merchant, Gould, Smith, Edell, Welter & Schmidt

[57] ABSTRACT

A tire cord fabric is disclosed, comprising a plurality of parallel warp threads and a plurality of weft threads interwoven with said warp threads. The weft threads have before dipping of the fabric a length which is longer than the width of the tire cord fabric by approximately the extent of the crimp or shrinkage occuring during dipping. The ends of the weft threads are returned into the fabric before dipping but during dipping such ends are more or less completely drawn out of the fabric due to the shrinkage or increased crimp so that they are finally positioned at the normally woven rims of the tire cord fabric.

3 Claims, 2 Drawing Figures

TIRE CORD FABRIC

BACKGROUND OF THE INVENTION

1. Field of the Invention

The invention relates generally to a tire cord fabric, and more particularly to a tire cord fabric for vehicle tires, comprising a plurality of parallel warp threads and a plurality of weft threads interwoven with said warp threads.

2. Description of the Art

It is common to produce tire cord fabric such that the weft threads are endlessly woven into the fabric so that at the margins of the fabric the weft threads are folded back or returned in order to directly form the next weft. During the dipping treatment of the finished fabric the threads thereof are stretched. The stretching has the effect that first the so-called crimp of the warp threads is eliminated. As a result, the fabric becomes narrower and that the crimp of the weft threads is increased. By means of the width stretch rollers, prior art techniques have attempted to maintain the normal width of the cord fabrics during dipping. However, with such prior art methods, the continuous weft threads will, in the marginal areas of the fabric, contract the warp threads so that the fabric has a higher density in its marginal areas.

To avoid this effect it is known to use a cord fabric having no weft threads so that only the parallel warp threads are introduced into the dipping system. Also, it has been proposed to use plastically deformable weft threads which can be plastically extended to avoid the increased weft crimp.

In order that the undesired phenomenon occuring by the dipping operation with known tire cord fabrics cannot have negative effects on the tires produced with such cord fabric it is typically the present practice to cut off the marginal areas of the cord fabric after dipping and frictioning so that those areas of the cord fabric which have been shrunk during dipping, and which therefore have a higher warp density, are not present in the frictioned cord fabric. Thus, an evenly dipped cord fabric is obtained. However, by cutting off the marginal areas, material is lost.

Cutting the continuous weft threads at the marginal rims of the cord fabric before dipping the same to avoid increasing the warp density in the marginal areas of the fabric, does not solve the problem, since the ends of the cut weft threads will be withdrawn from the marginal areas due to the crimping which is increased by the dipping operation, so that the fabric loses in its marginal areas the stability. Accordingly, also in such case the marginal areas of the dipped fabric have to be cut off and disposed.

The present invention addresses the above shortcomings of the prior art by producing a tire cord fabric characterized by even and uniform properties over its entire width, after dipping, so that the entire width of the fabric can be used in the production of vehicle tires without the necessity to cut off any parts thereof.

SUMMARY OF THE INVENTION

The invention provides that at least part of the weft threads of the cord fabric have before dipping, a length which is greater than the width of the cord fabric, approximately for a length corresponding to the crimp or shrinkage occuring during dipping. Thus, the warp threads of the cord fabric have also after dipping an even distribution or mutual distance over the entire width of the fabric, and are situated in one plane while the fabric does not lose its stability in the marginal area due to dipping. The weft threads are woven into the fabric in such manner that before dipping they are doubled in the marginal areas, for instance by returning the cut ends into the fabric or by cutting them in a certain distance from the marginal rims. The cord fabric can also be made such that weft threads of a definite length slightly larger than the width of the fabric are used and that the ends of such threads are returned into the fabric. Alternatively, endless weft threads are continuously woven into the fabric from the one and the other side thereof and thereafter each second weft is cut between the marginal rims of the fabric. In this latter case only each second weft thread extends after dipping of the cord fabric into its marginal areas, but that is completely sufficient to obtain a satisfactory stability of the fabric in its marginal areas.

Since in the cord fabric of the present invention the weft threads can shrink during dipping without causing an increase of the density of the warp threads or a decrease of the mutual distances thereof and without losing its interconnection with the warp threads, the tire cord fabric is, to the entire extent of its woven rims, without any waste, suitable as cord fabric for tires of all kind, especially for monoply tires, (i.e. for vehicle tires having only one cord ply).

The excess of length of the weft threads is calculated and chosen in view of the crimp or shrink expected during dipping so that the weft threads of the dipped cord fabric are thus reduced in length that they are normally woven into the fabric until its rims. For instance, the surplus length of the weft threads is at each end about 15 mm, (i.e. the weft threads are returned with a length of about 15 mm at each longitudinal rim of the cord fabric into the same or are cut in a distances from about 15 mm from the longitudinal rims of the cord fabric). However, the exact surplus length of the weft threads depends upon the crimp or shrinkage to be expected during dipping, (i.e. also from the materials properties of the weft threads and the width of the cord fabric).

BRIEF DESCRIPTION OF THE DRAWING

In the drawings, wherein like numerals represent like parts throughout the several views, one embodiment of the tire cord fabric of the present invention is schematically shown, wherein.

DESCRIPTION OF THE PREFERRED EMBODIMENT

The tire cord fabric 1 of the present invention comprises a pluarlity of warp threads 2 and a pluarlity of the weft threads 3 interwoven with said warp threads. The threads are of textile material of all kinds usual for the production of tire cord fabric.

Figure 1:
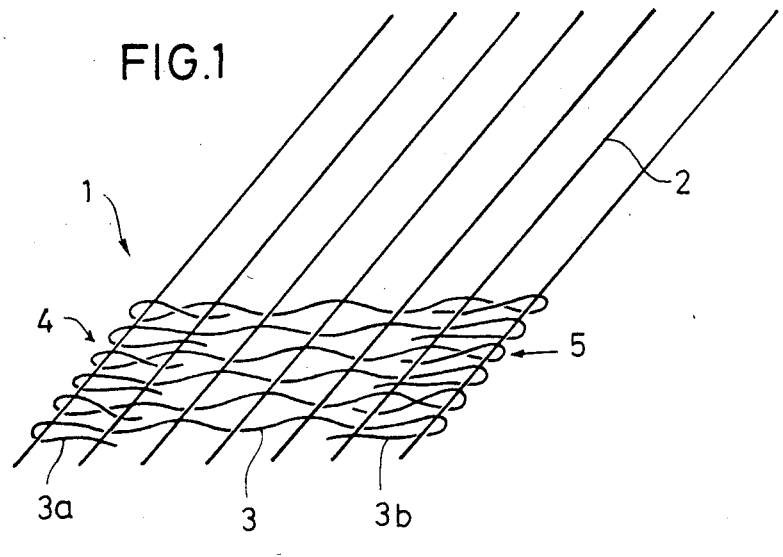
FIG. 1 is a perspective view of the cord fabric before dipping.

Referring to FIG. 1, it will be recognized that in the tire cord fabric 1, before dipping, the weft threads 3 clearly have a length longer than the width of the fabric, as defined by the warp threads 2, such that at the marginal rims 4 and 5 the ends 3a and 3b of the weft threads 3 are folded back and returned into the fabric.

In a preferred embodiment of the invention the weft threads are sized approximately 10 to 15 mm longer than the width of the fabric. Although the invention applies to any manner of interweaving the weft threads into the fabric, according to a preferred configuration of the invention, the weft threads are continuously inserted into the fabric, and every second weft is cut at a distance spaced from the longitudinal rims of the fabric equal to the desired length of such weft threads. In a preferred configuration of the invention wherein the continuous weft weaving configuration is used, every second weft is cut in a distance of 10 to 15 mm from the longitudinal rims of the fabric.

Figure 2:
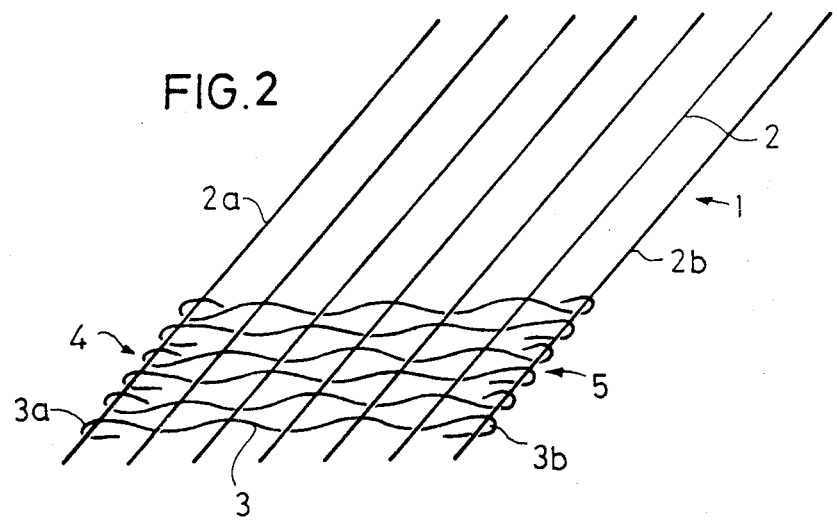
FIG. 2 is a perspective view of the same cord fabric after dipping.

Referring to FIG. 2, it will be recognized that the lengths of the warp threads 3 have been reduced during dipping so that the folded back ends 3a and 3b are now returned into the fabric with a clearly smaller length than they were prior to the dipping operation. The weft threads now have a length which is only sufficient to come into contact with those warp threads 2a and 2b at the very rim of the cord fabric 1. The dipped cord fabric 1 thus has, over its entire width, an even stability and can be used without cutting off any waste, because the increase of the crimp or the shrinkage of the weft threads during dipping did not result in reducing the distance of the parallel weft threads 2 in the marginal areas of the cord fabric. Accordingly, the cord fabric has an even thickness in the marginal areas as well as throughout the central portion of the fabric. The weft threads 3 which have been shrunk during the dipping operation sufficiently interconnect all warp threads 2 so that the finished cord fabric has even and uniform properties over its entire width.

We claim:

1. Tire cord fabric, comprising a plurality of parallel warp threads and a plurality of weft threads interwoven with said warp threads and longitudinally extending between oppositely disposed margins of said fabric and arranged generally perpendicularly to said warp threads, at least part of said weft threads being characterized by adjacent ones thereof being noncontinuous with one another and having a length before impregnating or dipping of said fabric during tire building, that exceeds the width of said fabric by approximately the extent of crimp which occurs to the weft threads during impregnating or dipping processes; wherein both distal ends of said interwoven weft threads are folded back into the tire fabric at the margins of said fabric; whereby the weft threads exert minimal lateral crimping forces on the warp cords at the fabric margins during dipping or impregnating of the fabric.

2. Tire cord fabric as recited in claim 1, wherein the weft threads which exceed the width of said fabric are about 10 to 15 mm longer at each end thereof than the width of the fabric.

3. Tire cord fabric as recited in claim 1, wherein the weft threads are continuously inserted into fabric and every second weft is cut in a distance of 10 to 15 mm from the longitudinal rims of the fabric.

* * * * *